(12) United States Patent
Bennett et al.

(10) Patent No.: US 8,281,245 B1
(45) Date of Patent: Oct. 2, 2012

(54) SYSTEM AND METHOD OF PREPARING PRESENTATIONS

(75) Inventors: Colin Bennett, New York, NY (US);
Emre Baran, New York, NY (US);
Michael Kleber, Newton, MA (US)

(73) Assignee: Google Inc., Mountain View, CA (US)

( * ) Notice: Subject to any disclaimer, the term of this patent is extended or adjusted under 35 U.S.C. 154(b) by 535 days.

(21) Appl. No.: 12/507,480

(22) Filed: Jul. 22, 2009

(51) Int. Cl.
*G06F 3/00* (2006.01)
*G06F 7/00* (2006.01)
*G06E 1/00* (2006.01)
*G06N 5/02* (2006.01)

(52) U.S. Cl. ............ 715/732; 707/722; 706/20; 706/46; 706/47; 706/48

(58) Field of Classification Search .................. 715/732; 707/722; 706/20, 46–48
See application file for complete search history.

(56) References Cited

U.S. PATENT DOCUMENTS

| | | | | |
|---|---|---|---|---|
| 7,836,053 | B2 * | 11/2010 | Naef, III | 707/737 |
| 7,991,715 | B2 * | 8/2011 | Schiff et al. | 706/20 |
| 8,117,210 | B2 * | 2/2012 | Cerosaletti et al. | 707/749 |
| 2005/0010553 | A1 * | 1/2005 | Liu | 707/1 |
| 2006/0111878 | A1 * | 5/2006 | Pendyala et al. | 703/1 |
| 2007/0233678 | A1 * | 10/2007 | Bigelow | 707/6 |
| 2010/0114985 | A1 * | 5/2010 | Chaudhary et al. | 715/732 |

OTHER PUBLICATIONS www.doubleclick.com/products/mediavisor/benefits.aspx, date retrieved Jun. 10, 2009.
www.doubleclick.com/products/mediavisor/index.aspx, date retrieved Jun. 15, 2008.
www.atlassolutions.com/solutions_othertools.aspx, date retrieved Jun. 10, 2009.
www.google.com/google-d-s/intl/en/tour1.html, date retrieved Jun. 1, 2009.
www.google.com/google-d-s/intl/en/tour2.html, date retrieved Jun. 1, 2009.
www.google.com/google-d-s/intl/en/tour3.html, date retrieved Jun. 1, 2009.
www.google.com/google-d-s/intl/en/tour4.html, date retrieved Jun. 1, 2009.
www.google.com/google-d-s/intl/en/tour5.html, date retrieved Jun. 1, 2009.
www.google.com/google-d-s/intl/en/tour6.html, date retrieved Jun. 1, 2009.
www.google.com/google-d-s/whatsnew.html, date retrieved Jun. 12, 2009.
Linden, Greg, et al., Amazon.com Recommendations, Item-to-Item Collaborative Filtering, Published by the IEEE Computer Society, pp. 76-80 (Jan./Feb. 2003).
U.S. Appl. No. 12/163,199.

* cited by examiner

*Primary Examiner* — Weilun Lo
*Assistant Examiner* — Dino Kujundzic
(74) *Attorney, Agent, or Firm* — Lerner, David, Littenberg, Krumholz & Mentlik, LLP

(57) ABSTRACT

A system and method of displaying presentation slides. In one aspect, the system and method provides presentation slides based on a user request for information. Both the request information and the slides are associated with identifiers. A set of slides is chosen by determining whether there are any corresponding identifiers between the request for information and the presentation slides. The slides are also chosen such that the set of slides does not include any slides associated with identifiers which are a proper subset of the identifiers of any other slide in the set.

25 Claims, 19 Drawing Sheets

|  | Product 1 | Product 2 | Product 3 | Product 4 | Product 5 |
|---|---|---|---|---|---|
| Category 1 | + | - | + |  | + |
| Category 2 | + |  | - |  | + |
| Category 3 | - |  | + |  |  |
| Category 4 | + | + |  | - |  |
| Category 5 |  |  | - | + | - |

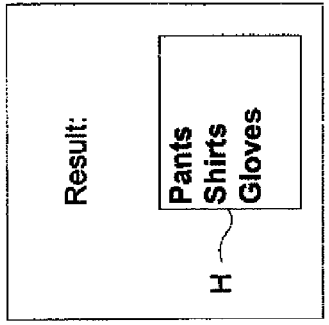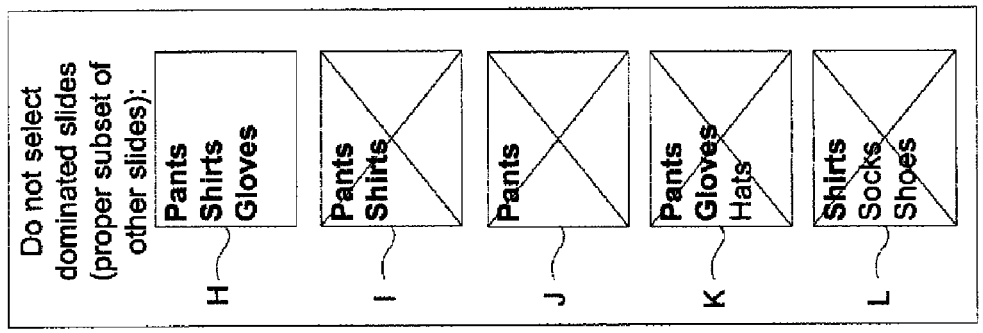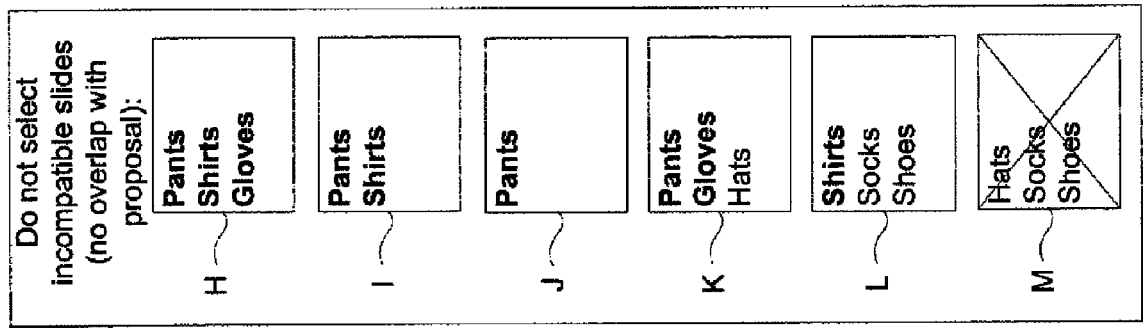
FIGURE 10B www.a.com

Company Description: Outdoor clothing company

Company Name:
A Clothing Company

Address:
123 Clothing Street
Clothing, NY 12345

Recommended Products:
Product 1    Product 3
Product 3

Proposal Information
Start Date: 1/1/2010  Goals: Make money
End Date: 2/1/2010

Filtered Products:
Product 4
Product 5

Campaign Information
Big Idea: Outdoor clothing campaign    Budget: $75,000

Objectives:
☐ Brand
☐ Lead Generation
☐ Transactions
☐ Launches/Promos

Geographic:
☐ Local
☐ National
☐ Global

Clothing Subcategories:
☒ Pants     ☒ Gloves
☐ Shoes    ☐ Socks
☐ Coats
☒ Shirts

FIGURE 15

SYSTEM AND METHOD OF PREPARING PRESENTATIONS

BACKGROUND OF THE INVENTION

Before beginning an advertising or other campaign, a company may submit requests for proposals or "RFPs" to various companies or individuals which provide advertising or other services. In response, a potential vendor such as an advertiser may create presentation materials in order to persuade the company, or client, to use the vender's services. For example, these presentations may include information regarding offered products and services, design, cost analyses, and other information. Venders invest significant amounts of time and capital to generate proposal presentations in response to an "RFP".

BRIEF SUMMARY OF THE INVENTION

One aspect of the invention provides a method of displaying presentation slides. The method includes receiving a request for information, the request being associated with a first set of identifiers. The method further includes selecting, with a processor, a group of presentation slides from among a plurality of presentation slides based on a comparison of the identifiers associated with the request and identifiers associated with the plurality of presentation slides. A presentation slide is a slide containing information to be rendered to a human readable display. The slides are selected such that each selected slide has at least one overlapping identifier, where an identifier overlaps if the identifier is a member of both the first set of identifiers and the slide's set of identifiers. The slides are also selected such that, within the group, the overlapping identifiers identified with one slide are not a proper subset of the overlapping identifiers in another slide. The method further includes displaying group of presentation slides.

In another aspect of the invention a method of displaying presentation slides includes receiving input from a user. Identifier information is associated with the input. The method further includes receiving a request for a recommended product. The recommended product is associated with a slide deck of a plurality of presentation slides. The method also includes selecting, with a processor, a group of presentation slides from the deck based on a comparison of the identifiers associated with the input and identifiers associated with the deck. The slides are selected such that each selected slide has at least one common identifier, where an identifier is a common identifier if the identifier is associated with both a slide and the input. The slides are also selected such that, within the group, common identifiers associated with one slide are not dominated by identifiers in another slide. The group of presentation slides is displayed.

Yet another aspect of the invention relates to a system including a user input device and a memory storing instructions and presentation visual data. The presentation visual data includes a plurality of presentation slides. The system also includes a processor in communication with the user input device so as to process information received from the user input device in accordance with the instructions. The system includes a display in communication with, and displaying information received from, the processor. The instructions comprise (1) receiving a request for a presentation slide, the request being associated with at least one tag, (2) selecting, with a processor, a group of presentation slides from the presentation visual data based on a comparison of the at least one tag associated with the request and tags associated with the plurality of presentation slides, and (3) displaying a proposal slide of the group of slide. The slides are selected such that each selected slide has at least one overlapping tag, where an tag overlaps if the tag is a member of both the first set of tags and the slide's set of tags. The slides are also selected such that, within the group, the overlapping tags identified with one slide are not a proper subset of the overlapping tags in another slide.

In still a further aspect of the invention, a system includes a user input device and a memory storing instructions and slide data including a plurality of presentation slides, each slide associated with priority information. The system further includes a processor in communication with the user input device so as to process information received from the user input device in accordance with the instructions. The system also includes a display in communication with, and displaying information received from, the processor. The instructions comprise (1) receiving a request for a presentation slide, the request being associated with at least one identifier, (2) selecting, with a processor, a group of presentation slides from the slide data based on a comparison of the at least one identifier associated with the request and identifiers associated with the plurality of presentation slides, (3) determining, based on the priority information, which of the group of slides are to be displayed as priority slides and which of the group of slides are to be displayed as non-priority slides, and (4) displaying the priority slides. The slides are selected such that each selected slide has at least one overlapping identifier, where an identifier overlaps if the identifier is a member of both the first set of identifiers and the slide's set of identifiers. The slides are also selected such that, within the group, the overlapping identifiers identified with one slide are not a proper subset of the overlapping identifiers in another slide.

In another aspect of the invention, the invention relates to a method of providing a proposal. The method includes receiving a request for a presentation of slides and determining a set of tags associated with the request. The method also includes providing data identifying a recommended product associated with a plurality of presentation slides and displaying a group of presentation slides selected by a processor. The slides are selected based on a comparison of the tags associated with the request and tags associated with the plurality of presentation slides. The group of presentation slides is selected such that each slide of the group of presentation slides has at least one tag common with the tag associated with the request and such that the overlapping tag identified with a slide of the group of presentation slides are not a dominated by the tag in another slide. A proposal of slides selected from the group of presentation slides is provided.

In yet another aspect, a computer-usable medium including a program. The program includes computer code that response to receiving a request for information associated with a first set of identifiers. The program also includes computer code that selects a group of presentation slides from among a plurality of presentation slides based on a comparison of the identifiers associated with the request and identifiers associated with the plurality of presentation slides. A presentation slide is a slide containing information to be rendered to a human. The slides are selected such that each selected slide has at least one overlapping identifier, where an identifier overlaps if the identifier is a member of both the first set of identifiers and the slide's set of identifiers. The slides are also selected such that, within the group, the overlapping identifiers identified with one slide are not a proper subset of the overlapping identifiers in another slide. The program also includes computer code that displays the group of presentation slides.

BRIEF DESCRIPTION OF THE DRAWINGS

FIG. 5 is a diagram in accordance with one aspect of the invention.

FIG. 7 is a screen shot in accordance with one aspect of the invention.

FIGS. 10A and 10B are a diagram in accordance with one aspect of the invention.

FIG. 15 is a screen shot in accordance with one aspect of the invention.

DETAILED DESCRIPTION

In one aspect, the system and method provides and displays presentation slides based on user requests for information. Slides are selected by comparing identifiers associated with the requests to identifiers associated with the slides. Slides are chosen where there is at least one corresponding identifier. Slides are also chosen such that no slide is associated with identifiers which are a proper subset of the identifiers of another chosen slide.

Figure 1:
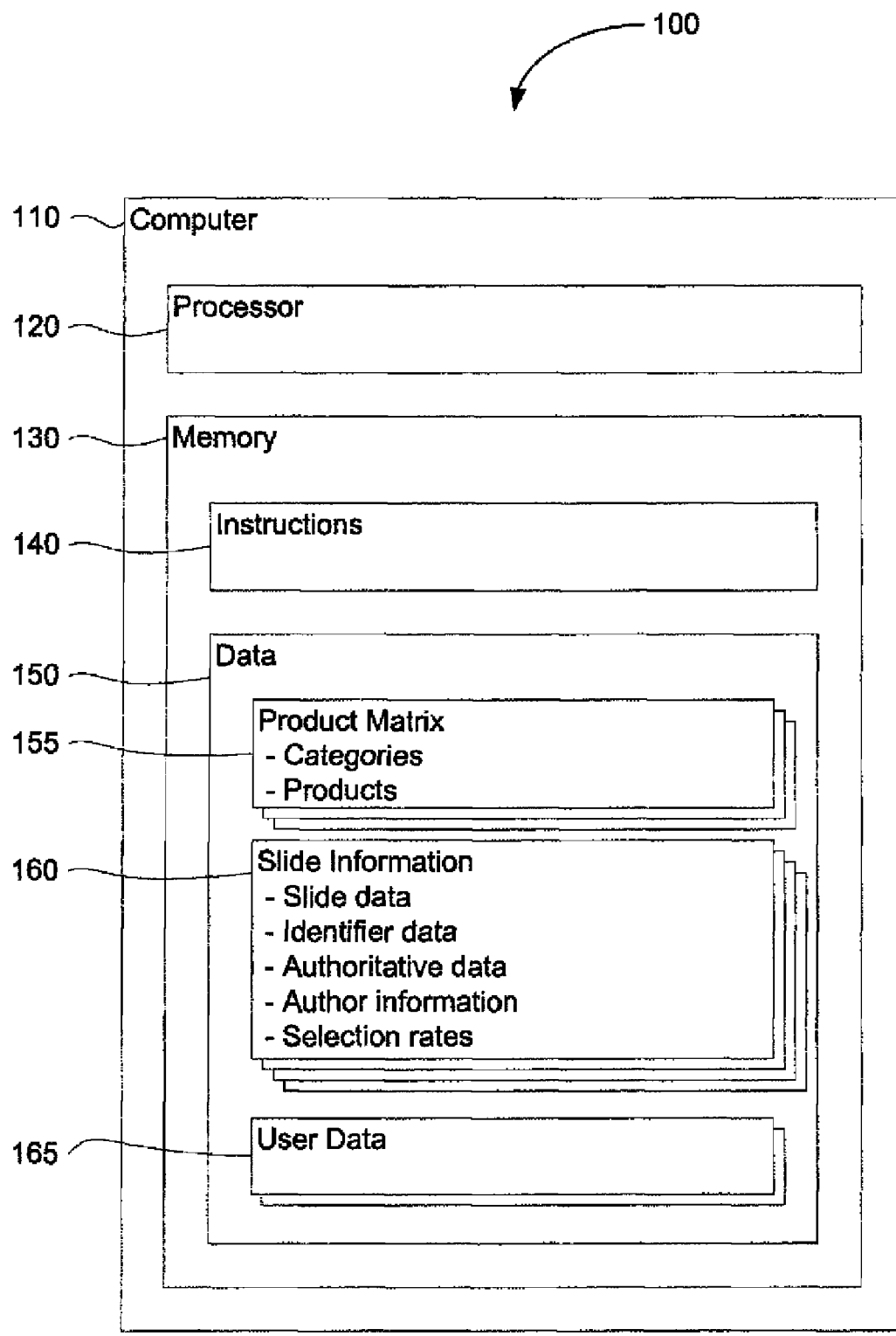
FIG. 1 is a functional diagram of a computer in accordance with an aspect of the invention.

As shown in FIG. 1, a system 100 in accordance with one aspect of the invention includes a computer 110 containing a processor 120, memory 130 and other components typically present in general purpose computers.

Memory 130 stores information accessible by processor 120, including instructions 140 that may be executed by the processor 120. It also includes data 150 that may be retrieved, manipulated or stored by the processor. The memory may be of any type capable of storing information accessible by the processor, including a computer-readable medium such as a hard-drive, memory card, ROM, RAM, DVD, CD-ROM or other optical disks, as well as other write-capable and read-only memories. The processor 120 may be any processor, such as processors from Intel Corporation or AMD. Alternatively, the processor may be a dedicated controller such as an ASIC.

The instructions 140 may be any set of instructions to be executed directly (such as machine code) or indirectly (such as scripts) by the processor. For example, the instructions may be stored as computer code on the computer-readable medium. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 150 may be retrieved, stored or modified by processor 120 in accordance with the instructions 140. For instance, although the system and method is not limited by any particular data structure, the data may be stored in computer registers, in a relational database as a table having a plurality of different fields and records, XML documents, or flat files. The data may also be formatted in any computer-readable format such as, but not limited to, binary values, ASCII or Unicode. By further way of example only, image data may be stored as bitmaps comprised of pixels that are stored in compressed or uncompressed, or lossless or lossy formats (e.g., JPEG), vector-based formats (e.g., SVG) or computer instructions for drawing graphics. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM, an external device, a network device, and others within a read-only computer chip. Some or all of the instructions and data may be stored in a location physically remote from, yet still accessible by, the processor. Accordingly, references to a processor or computer will be understood to include references to a collection of processors or computers that may or may not operate in parallel.

The computer 110 may be at one node of a network 105 and capable of directly and indirectly communicating with other nodes of the network. For example, computer 110 may comprise a web server that is capable of communicating with client devices 170 and 180 via network 105. Yet further, server 110 may use network 105 to transmit and display information to user 190 on monitor 175 of client device 170, and the monitor 175 of client device may also show locally stored display information and locally processed data.

Figure 2:
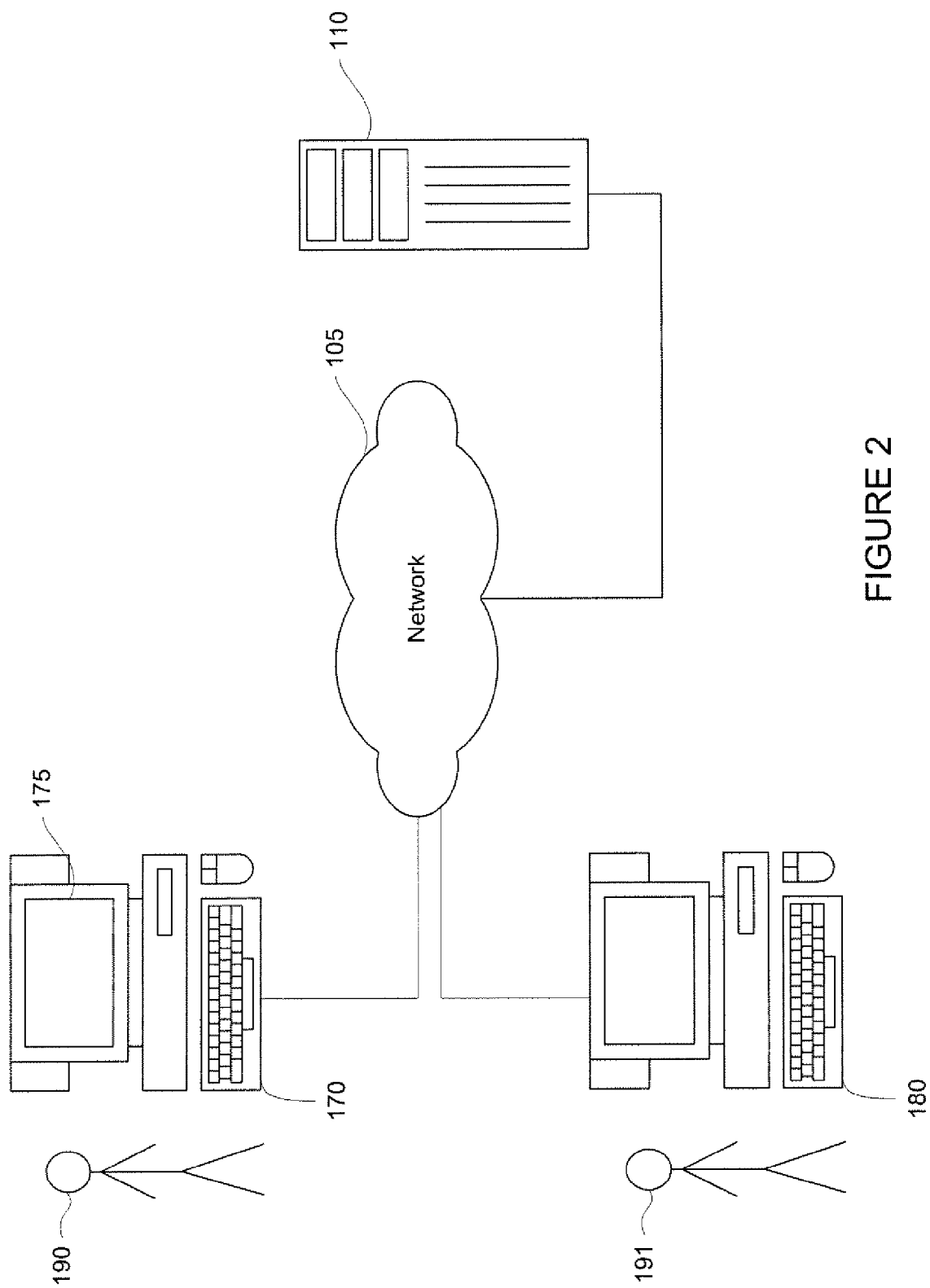
FIG. 2 is a pictorial diagram of a system in accordance with an aspect of the invention.

Network 105, and intervening nodes, may comprise various configurations and protocols including the Internet, World Wide Web, intranets, virtual private networks, wide area networks, local networks, private networks using communication protocols proprietary to one or more companies, Internet relay chat channels (IRC), instant messaging, simple mail transfer protocols (SMTP), Ethernet, WiFi and HTTP, and various combinations of the foregoing. Although only a few computers are depicted in FIGS. 1-2, it should be appreciated that a typical system can include a large number of connected computers, with each different computer being at a different node of the network 105. Moreover, as noted above, server 110 and the other devices may comprise collections of devices at multiple nodes of the network.

Each client device may be configured with a processor, memory and instructions. Each client device 170 and 180 may be a personal computer, intended for use by a person 190-191, having all the internal components normally found in a personal computer such as a central processing unit (CPU), display device (for example, a monitor having a screen, a projector, a touch-screen, a small LCD screen, a television, or another device such as an electrical device that is operable to display information processed by the processor), a computer-readable medium (for example, a CD-ROM, hard-drive, RAM or ROM), user input (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, mobile devices, network computers lacking local storage capability, and set-top boxes for televisions.

Although certain advantages are obtained when information is transmitted or received as noted above, other aspects of the system and method are not limited to any particular manner of transmission of information. For example, in some aspects, information may be sent via a medium such as a disk, tape, a solid state device or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Data 150 of computer 110 may store product matrix 155. As will be described in further detail below, product matrix 155 associates categories, for example business categories, with various products and product information.

Data 150 of computer 110 may store slide information 160. For example, slide information 160 may include slide data regarding the components of a presentation slide such as text, images, backgrounds, and titles. Slide information 160 may also include information regarding the author of a presentation slide and the number of times which the slide has been selected by users. Yet further, the slide information may identify the slide's expiration data, i.e., the date by which the information contained on the slide is considered unlikely to be reliable or helpful for its intended purpose. A slide expiration date can be computed by way of a number of factors, including but not limited to time since creation of the slide, time since last use of the slide, usage during a particular time period, and usage relative to other slides with the same or similar labels.

Slide information 160 may also include identifier data. As will be described below, each presentation slide is associated with identifiers. These identifiers or tags may be names chosen from a structured vocabulary which is used to identify, for example, the content or uses for the slides.

Slide information 160 may also include authoritative data. As will be described below, each presentation slide may be designated as authoritative or non-authoritative. For example, authoritative slides may be generated or designated by the program or a program administrator while non-authoritative slides may be user-generated. Slide information 160 may also include confidentiality data. For example, a slide may be noted as including confidential information of the vendor only to be shared under a non-disclosure agreement, confidential information of the company/advertiser not to be used in other presentations, or sensitive information not to be used in presentations outside of the vendor.

Data 150 may of computer 110 may store user data 165. For example, user data 165 may include usernames and passwords, company information such as names, addresses, information regarding past proposals or advertising campaigns, and other business information.

Figure 17:
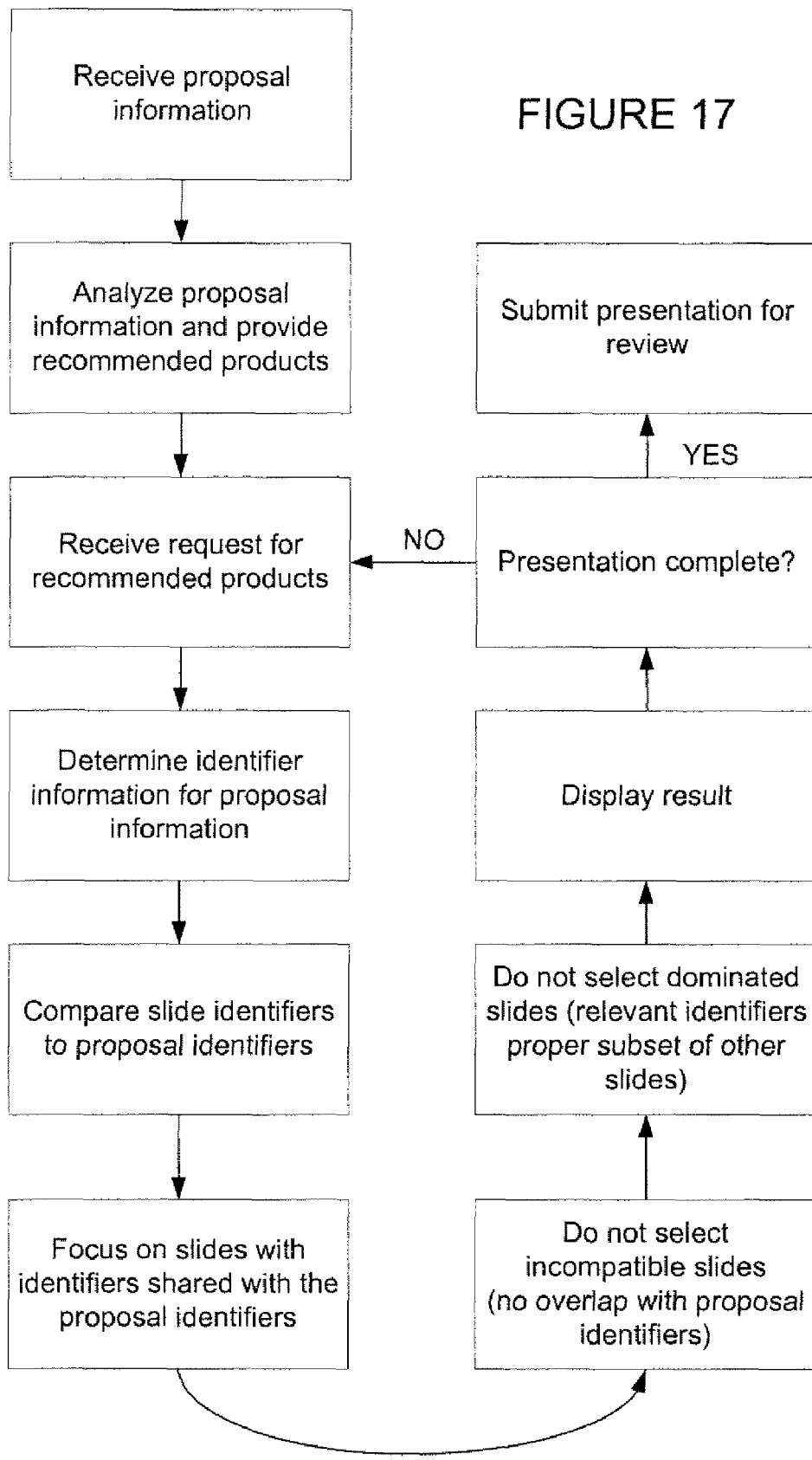
FIG. 17 is a flowchart in accordance with an aspect of the invention.

In addition to the operations illustrated in FIG. 17, various operations in accordance with a variety of aspects of the invention will now be described. It should be understood that the following operations do not have to be performed in the precise order described below. Rather, various steps can be handled in reverse order or simultaneously.

Figure 3:
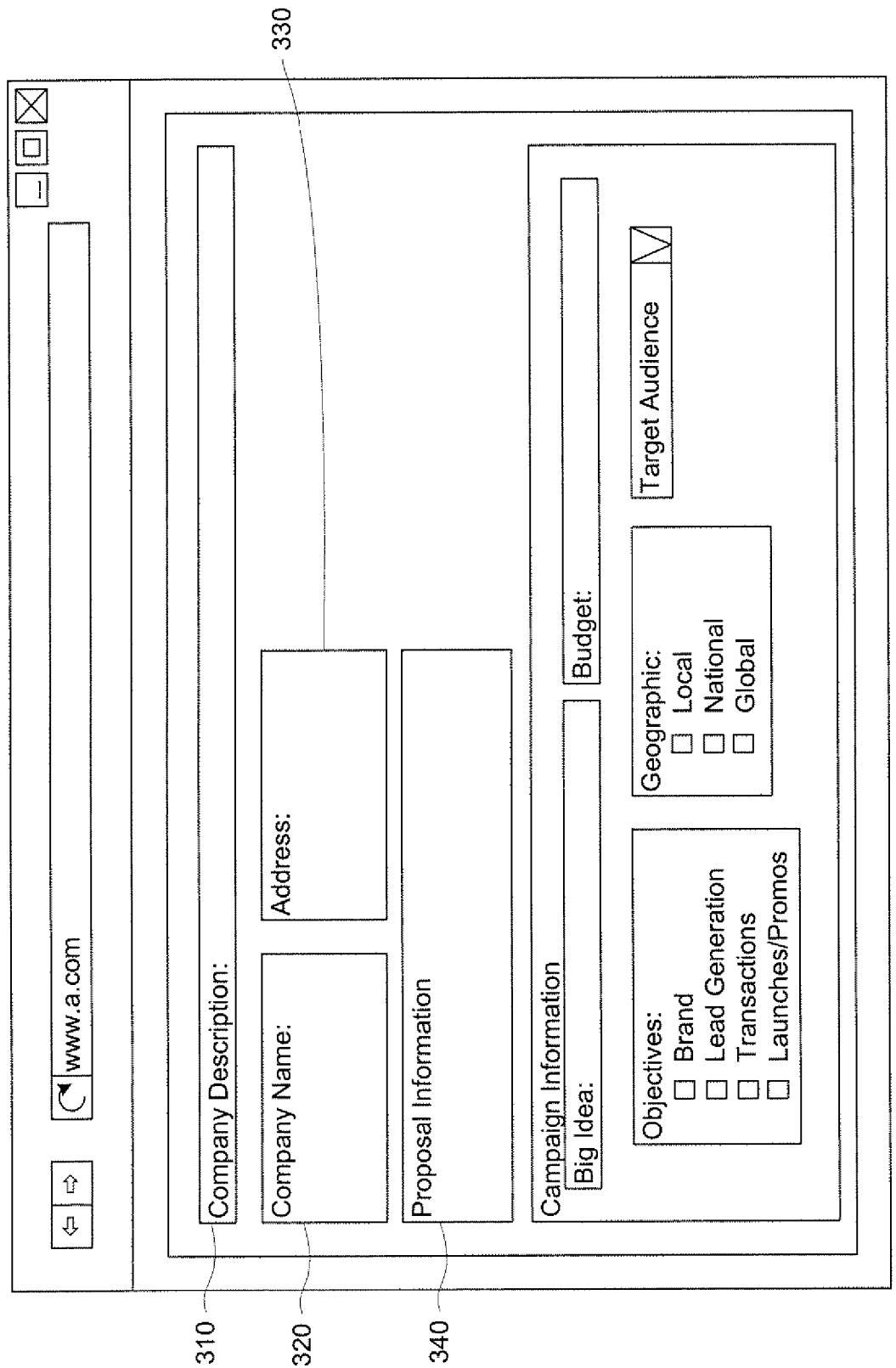
FIG. 3 is a screen shot in accordance with one aspect of the invention.

A user may input information as part of a request for proposal. FIG. 3 illustrates a screen shot that may be displayed by a display device at the computer 110. The user may input information such as a company description 310, company name 320, company address 330, and proposal information 340. Proposal information 340 may include start and end dates or goals. The user may enter this information or the program may respond when the user begins to enter information by filling in certain fields. For example, the user may enter the company name, and the program may fill in the address 330 field automatically.

Figure 4:
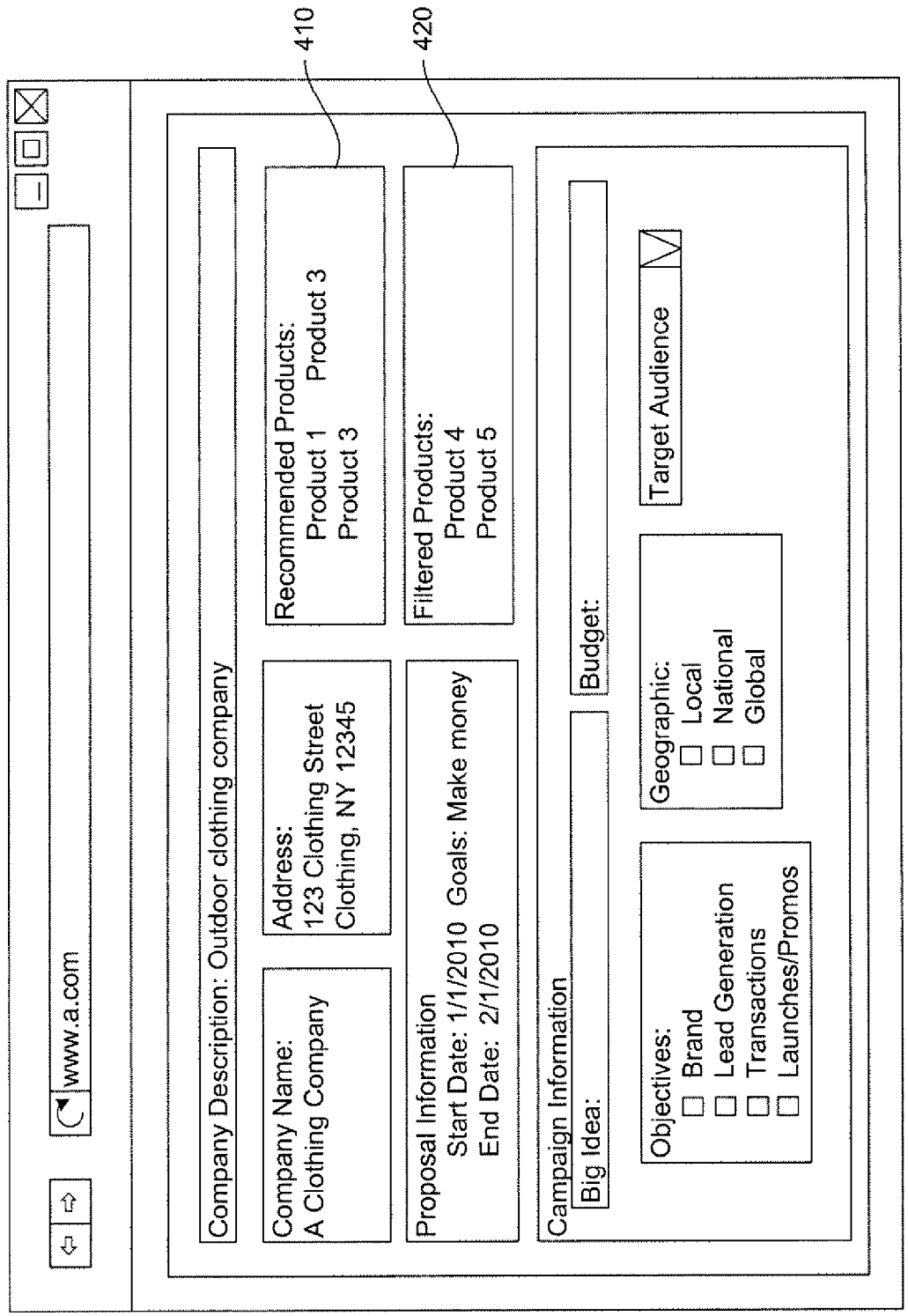
FIG. 4 is a screen shot in accordance with one aspect of the invention.

As the user fills in the company and proposal information, the program will respond by displaying a list of recommended products 410. As shown in FIG. 4, recommended products 410 may be displayed as a list of products (generically illustrated in FIG. 4 as "Product 1", "Product 2", etc.). Products may include, for example, search, text content, rich media and display content, TV, video services such as the YouTube service, audio, print, mobile, analytics, free content distribution or other products. The program may also display a list of products which are not recommended (hereafter, "non-recommended"), for example filtered products 420.

Yet another category of products may comprise those that are recommendation-neutral, i.e., those that are neither recommended nor non-recommended. In one aspect, such neutral products may appear in the list of recommended products 410. In other aspects, the neutral products may be shown separately or hidden from view. The program may also provide the user with the option to move the non-recommended products to the recommended products 410, for example with an "add" button.

A product matrix may be used to determine which products to recommend to the user. As shown in FIG. 5, a product matrix may include both business categories and products. Business categories may include, for example, clothing, automotive, restaurant, entertainment or any other category. Although only five categories and products are depicted in FIG. 5, product matrix 155 may include any number of categories or products. Each business category in the matrix has a particular relationship with each product. For example, in FIG. 5, category 1 is positively associated with products 1, 3, and 5 such that those products are recommended for category 1. Accordingly, when business category 1 is inputted or determined to be relevant to the information inputted by the user, products 1, 3, and 5, may be displayed to the user as recommended products. Category 3 is negatively associated with product 2, and accordingly, product 2 may be a non-recommended product. In the example, there is no particular association between category 1 and product 4. This may indicate that the product is neutral with respect to that category. The matrix may also include associations between other business categories, such as category 2, which as shown in FIG. 5 may have a negative association with product 3, a positive association with products 1 and 5, and neither positive nor negative association with products 2 and 4. Each category may have negative, positive, or no associations with each product.

Figure 6:
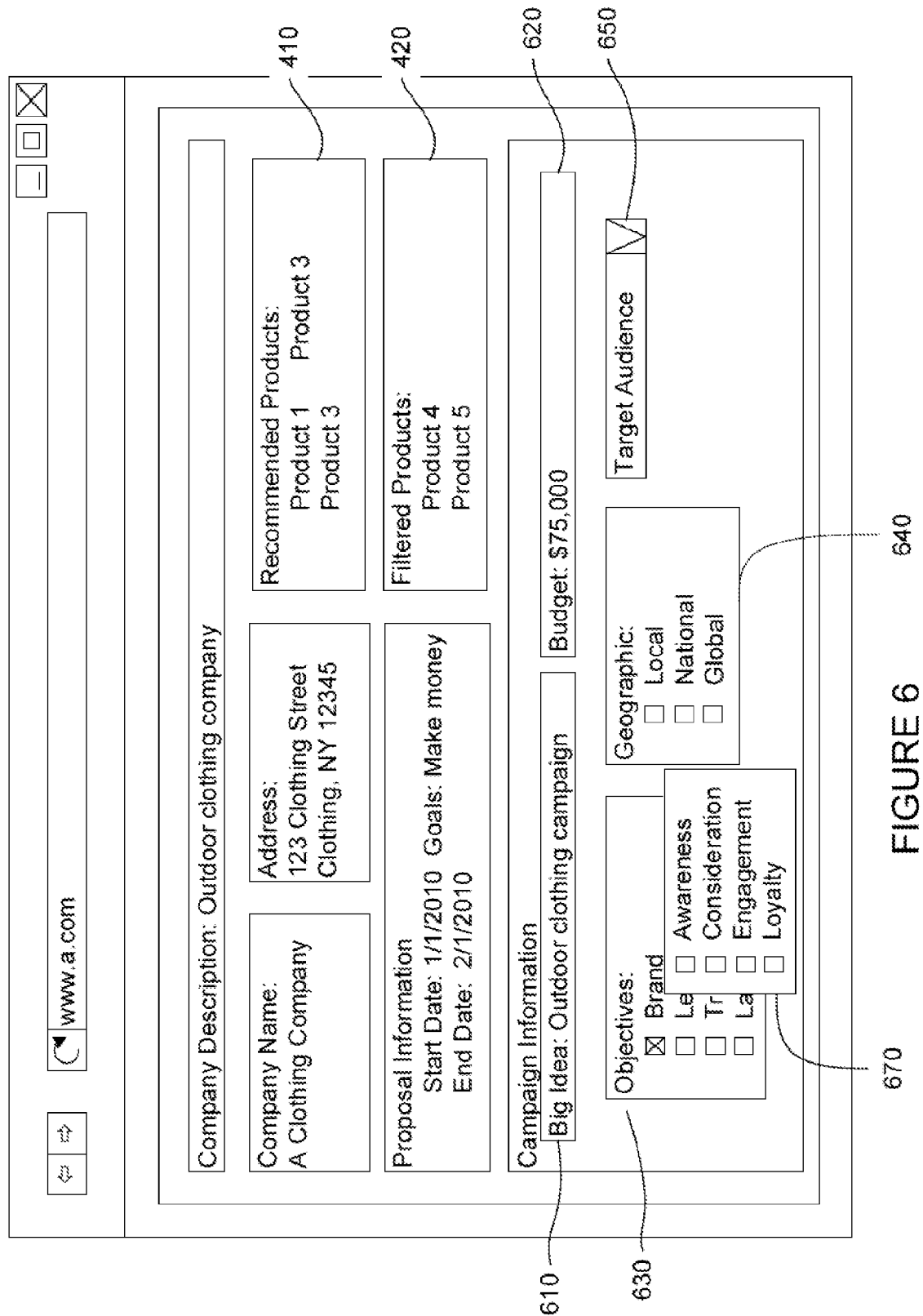
FIG. 6 is a screen shot in accordance with one aspect of the invention.

The program may also allow the user to input campaign information. For example, as shown in FIG. 6, the user may input a general campaign concept or "Big Idea" information 610, budget information 620, objectives 630, geographic information 640, target audience information 650, or any other campaign information. The information may be input in various ways. For example, the user may select a box indicating that the user is interested in "Brand" objectives. A pop-up box 670 may appear listing further subcategories which the user may also select.

Figure 7:
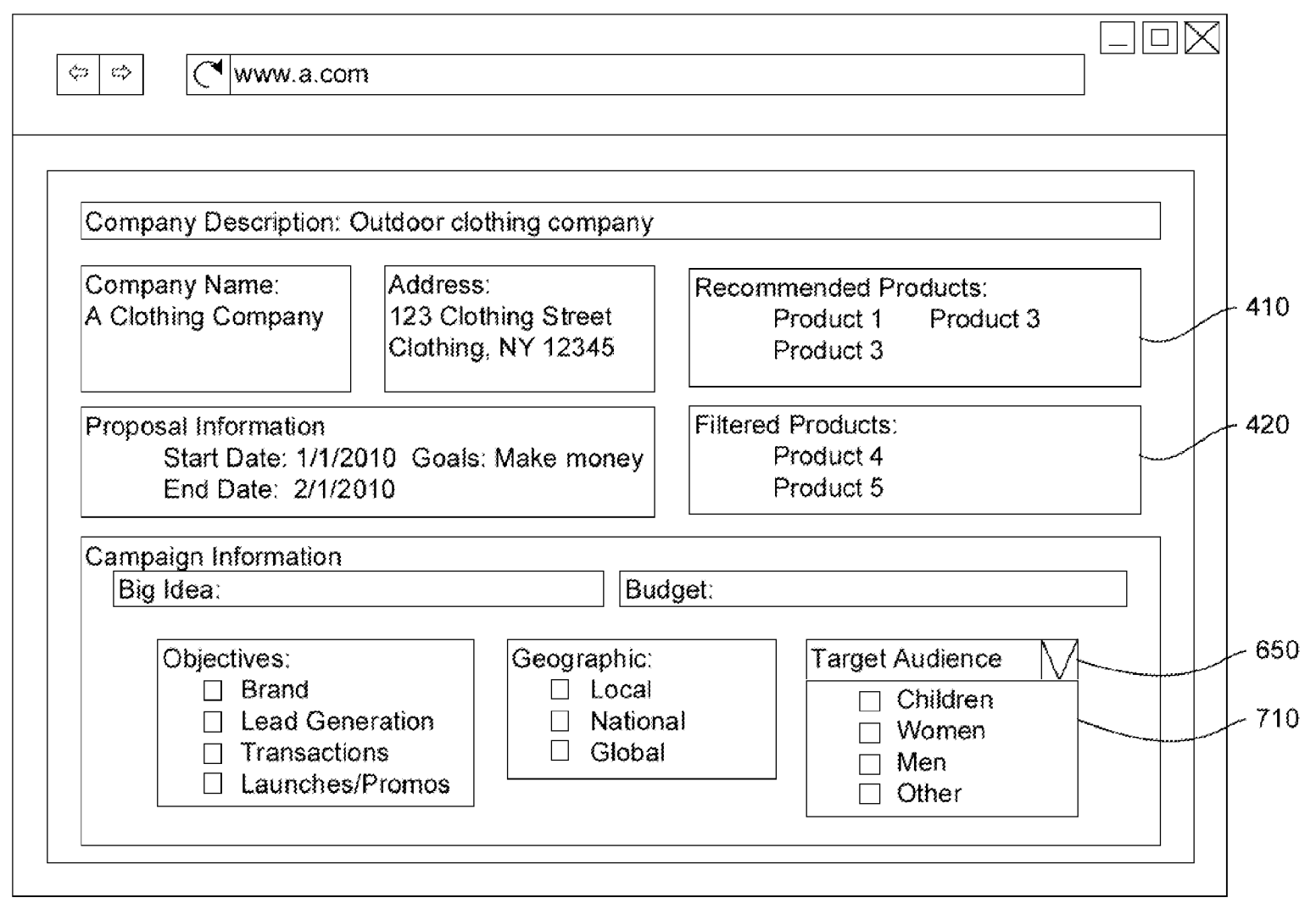

In another example, shown in FIG. 7, information is provided in a drop-down menu. For example, the user may choose to input target audience information. An arrow next to target audience 650 may provide the user with a drop-down menu 710.

Campaign information may also be used to update recommended products 410 and filtered products 420 according to the product matrix. For example, the program may determine relevant categories from the inputted campaign information and provide or filter recommended products 410 accordingly.

After entering the initial business and campaign information, the user may begin to select slides for the proposal. The proposal may consist of one or more slides selected and potentially edited by the user. Once the selection of slides is complete, the user may save, print, or submit the proposal for review.

Figure 8:
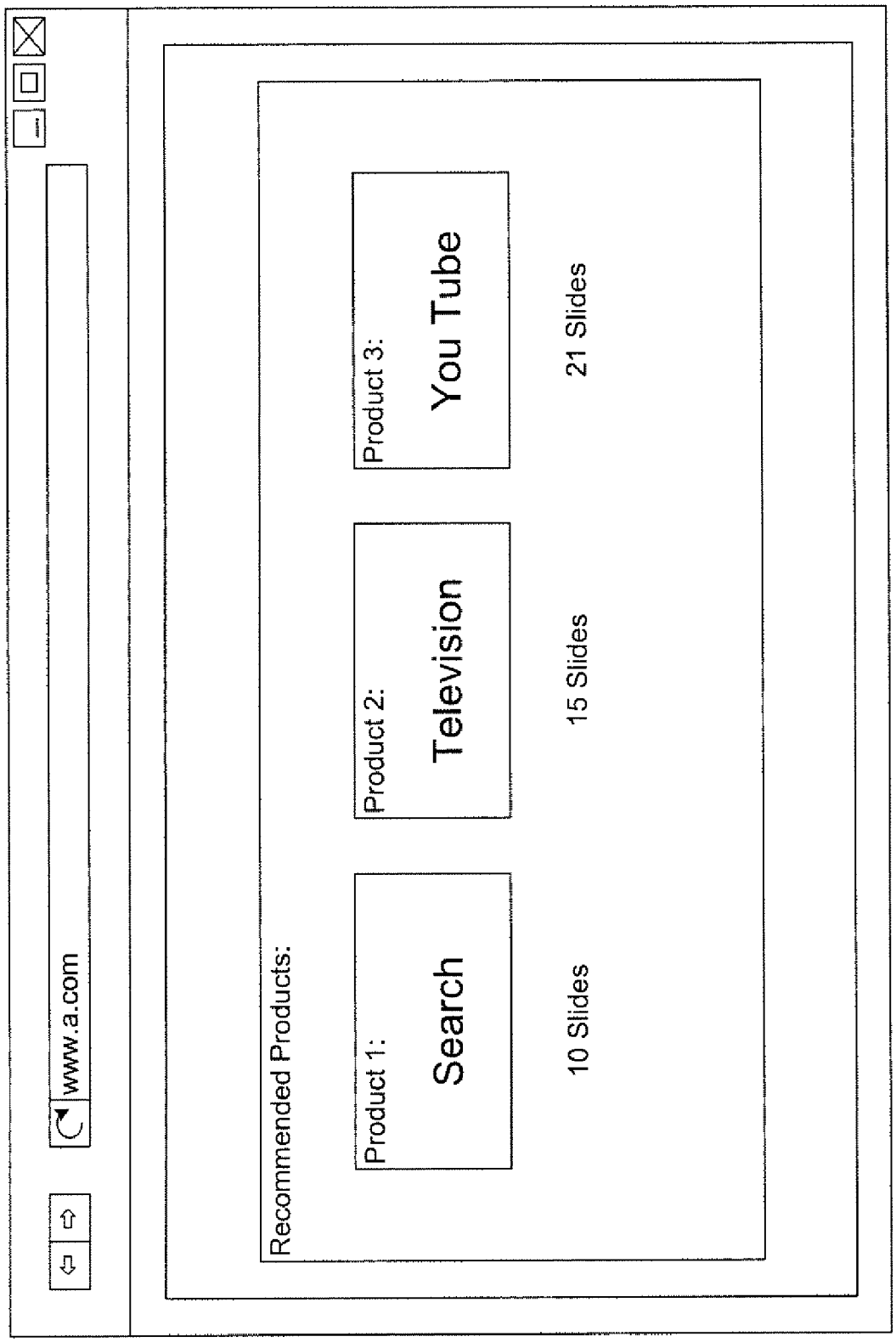
FIG. 8 is a screen shot in accordance with one aspect of the invention.

Once the user has completed inputting company and campaign information, the user may choose a recommended product deck. As shown in FIG. 8, each recommended product is associated with one or more slide decks, each slide deck including one or more slides or presentation images. In the example, the user is presented with search, television, and YouTube slide decks, each of which is associated with a recommended product determined from the input information as described above.

The program selects which slides to display to the user based on identifier data. As noted above, each slide may be associated with one or more identifiers or tags. Based on the company and campaign information provided by the user, the program determines which tags are relevant to the proposal. The program then compares the tags determined from the input with the tags associated with the slides. The result is a list of slides displayed to the user.

Figure 9A:
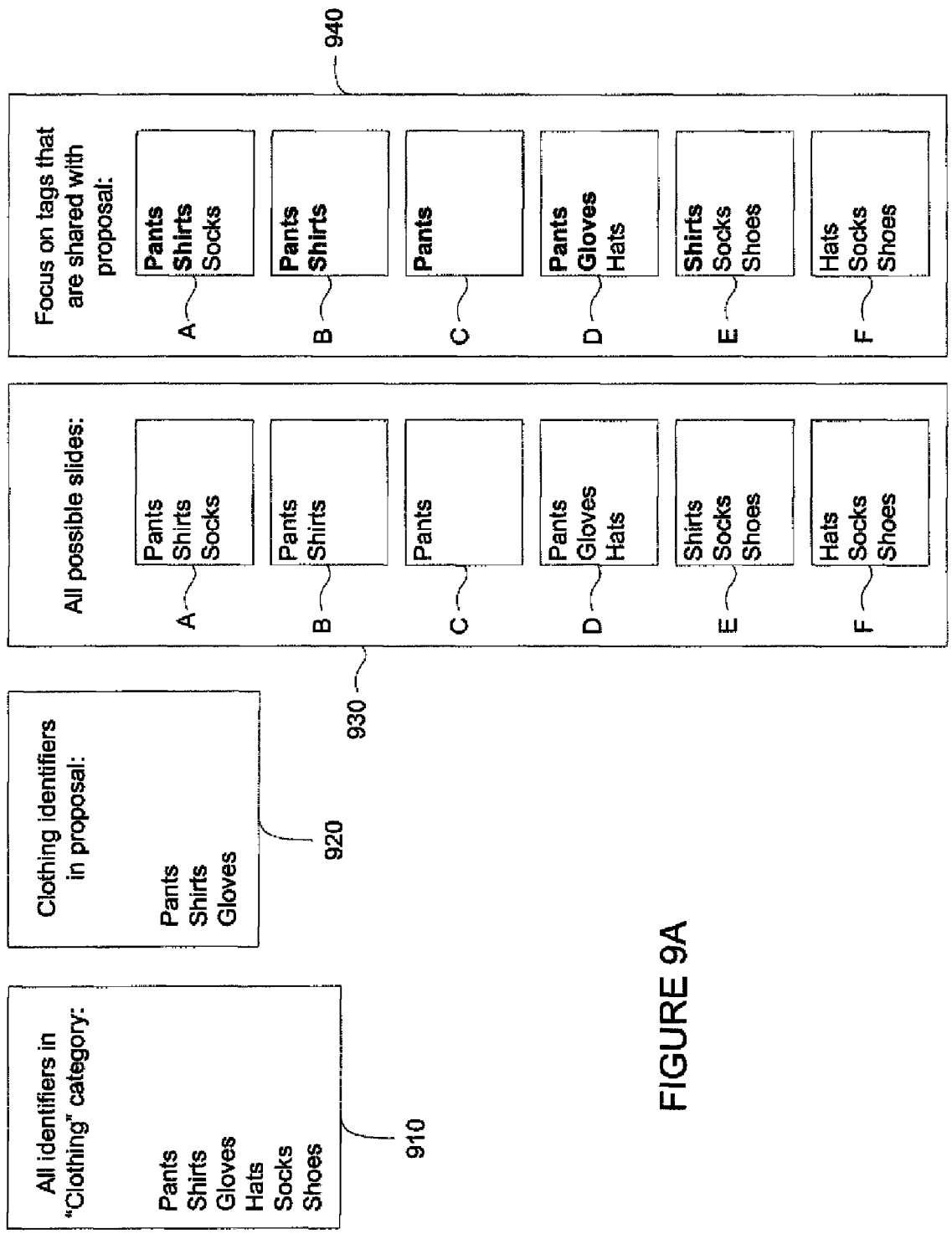
FIGS. 9A and 9B are a diagram in accordance with one aspect of the invention.
Figure 9B:
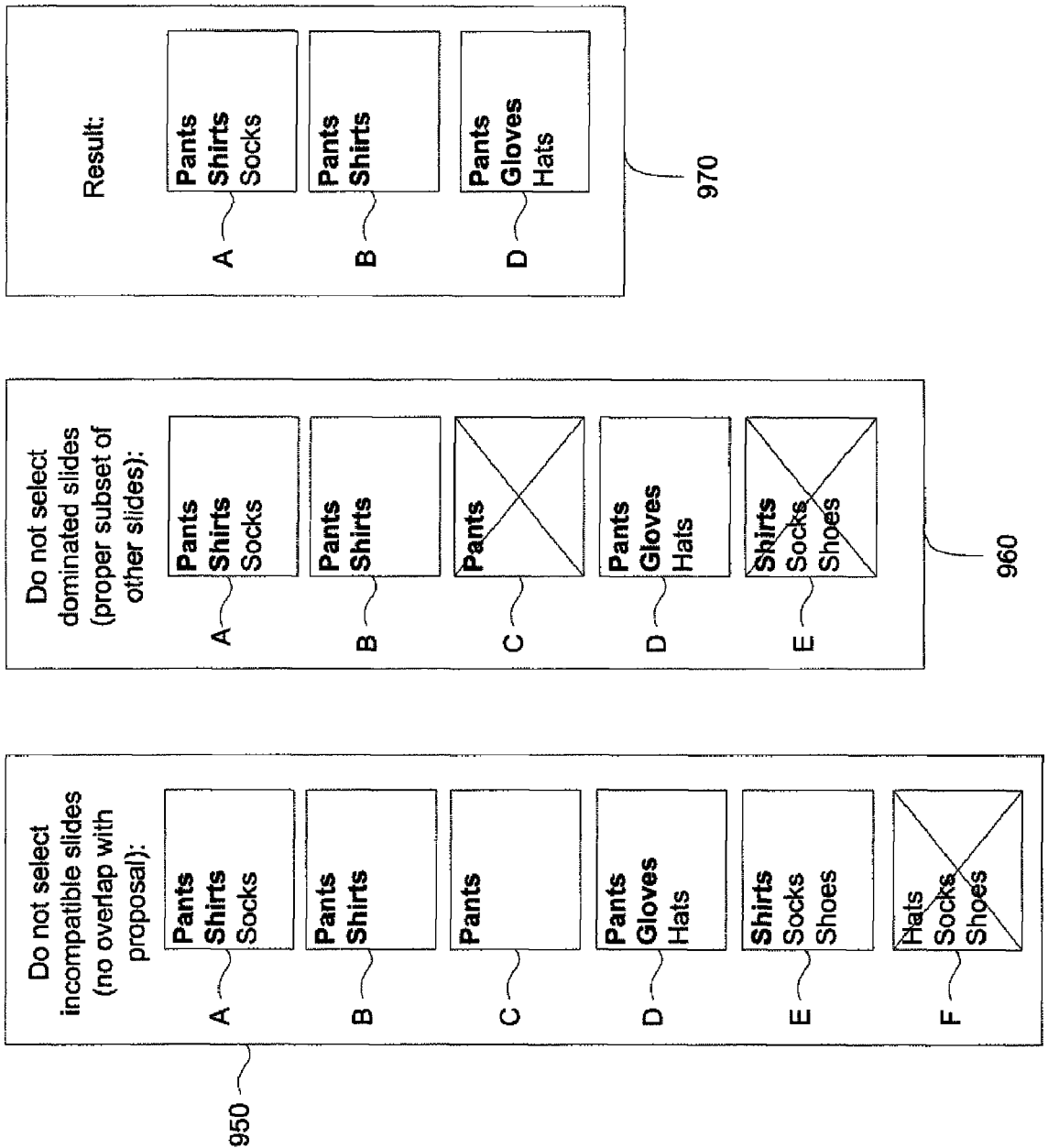

FIGS. 9A and 9B show an exemplary method of providing slides. In the example, list 910 identifies all of the tags associated with category "clothing." List 920 identifies all of the tags in the category of clothing that were provided by the user or derived from the proposal and entered into the system, e.g., pants, shirts, and gloves. (It will be understood that clothing tags such as pants, shirts and the like are selected for illustration purposes only.) The program compares all possible slides 930 to the tags in the proposal. In the example of FIG. 9A, all possible slides 930 includes only slides associated with tags within the clothing category, though these slides may also be associated with tags which are also not within the clothing category.

The program may initially focus on the tags that are common between the slides and the proposal. For example, as shown in block 940, slides A-E are associated with relevant tags determined from the input information. In the exemplary figures, this association is depicted by the bolding of the tags. Slide F does not contain any relevant tags. Therefore, as shown in block 950, slide F may be removed or selected as not for display to the user.

In one aspect, a slide is not be displayed to the user if it is dominated. Dominated slides are slides that are associated with relevant tags that are a proper subset of the relevant tags of another slide may. As shown in the example of block 960 of FIG. 9B, the tag of slide C, pants, is a proper subset of the relevant tags of slides A, B, and D. Therefore, as shown in block 970, slide C may not be displayed to the user. The relevant tags (e.g., the tag "shirts") of slide E are a proper subset of relevant tags of slides A and B (each of which contains the tags "pants" and "shirts"). Therefore, slide E may not be displayed to the user.

As shown in block 970, the remaining slides may be displayed to the user.

Figure 10A:
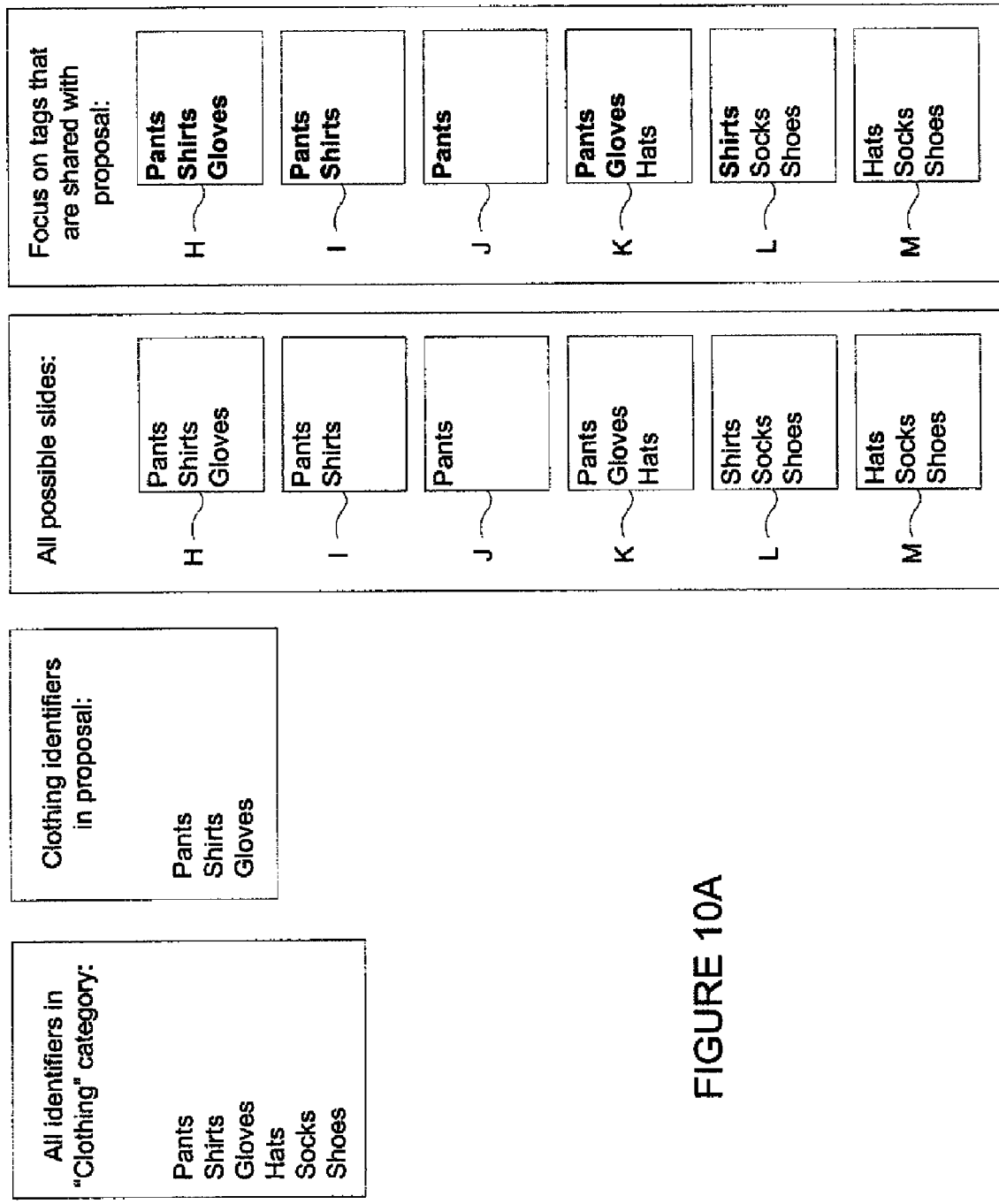

FIGS. 10A and 10B also show an exemplary method of providing slides. In the example of FIGS. 10A and 10B, slide M is not associated with any of the tags determined from the proposal information. Therefore, slide M may not be displayed to the user. Slides I-L also associated with relevant tags which are a proper subset of slide H. Therefore, slides I-L may also not be displayed to the user. The result is slide H, which is displayed to the user.

The slides may be presented to the user as authoritative and non-authoritative. Authoritative slides are slides that have been designated by one or more users as being particularly effective at conveying certain types of information. For example, an authoritative slide may be a slide that has been approved by a supervisor as "authoritative" because it meets all corporate requirements and has been used in many successful presentations. The remaining slides are non-authoritative. Non-authoritative slides typically include, but are not limited to, slides that were created by individual users for individual projects.

Authoritative slides are thus typically given a higher priority than non-authoritative slides, and this priority status may be reflected in a number of ways including the order in which suggested slides are displayed. The slides may also be prioritized on other bases as well.

Figure 11:
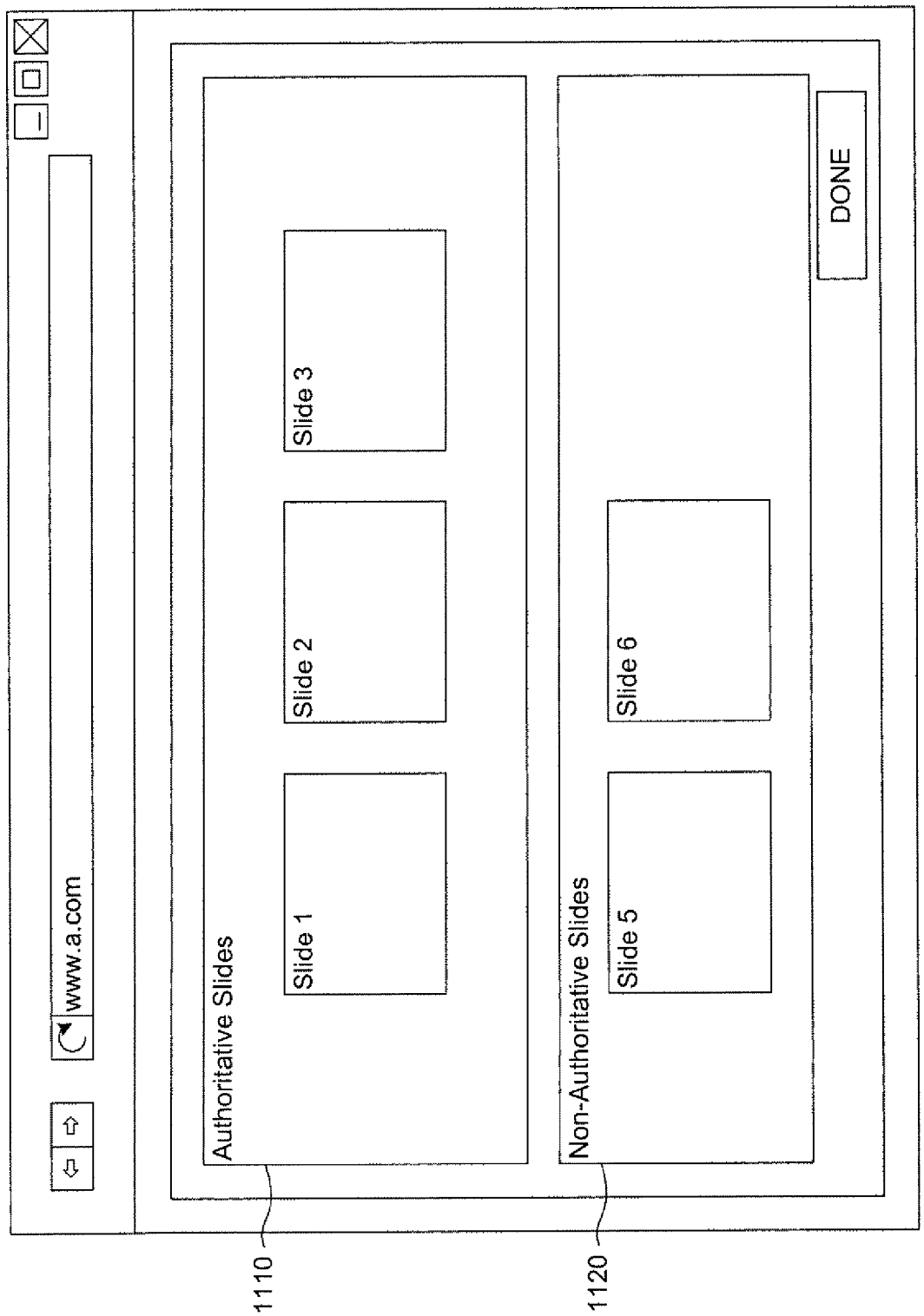
FIG. 11 is a screen shot in accordance with one aspect of the invention.

As shown in FIG. 11, when the slides are displayed they may be segregated into two groupings; authoritative slides 1110 and non-authoritative slides 1120. The user may choose slides from both groupings.

Figure 12:
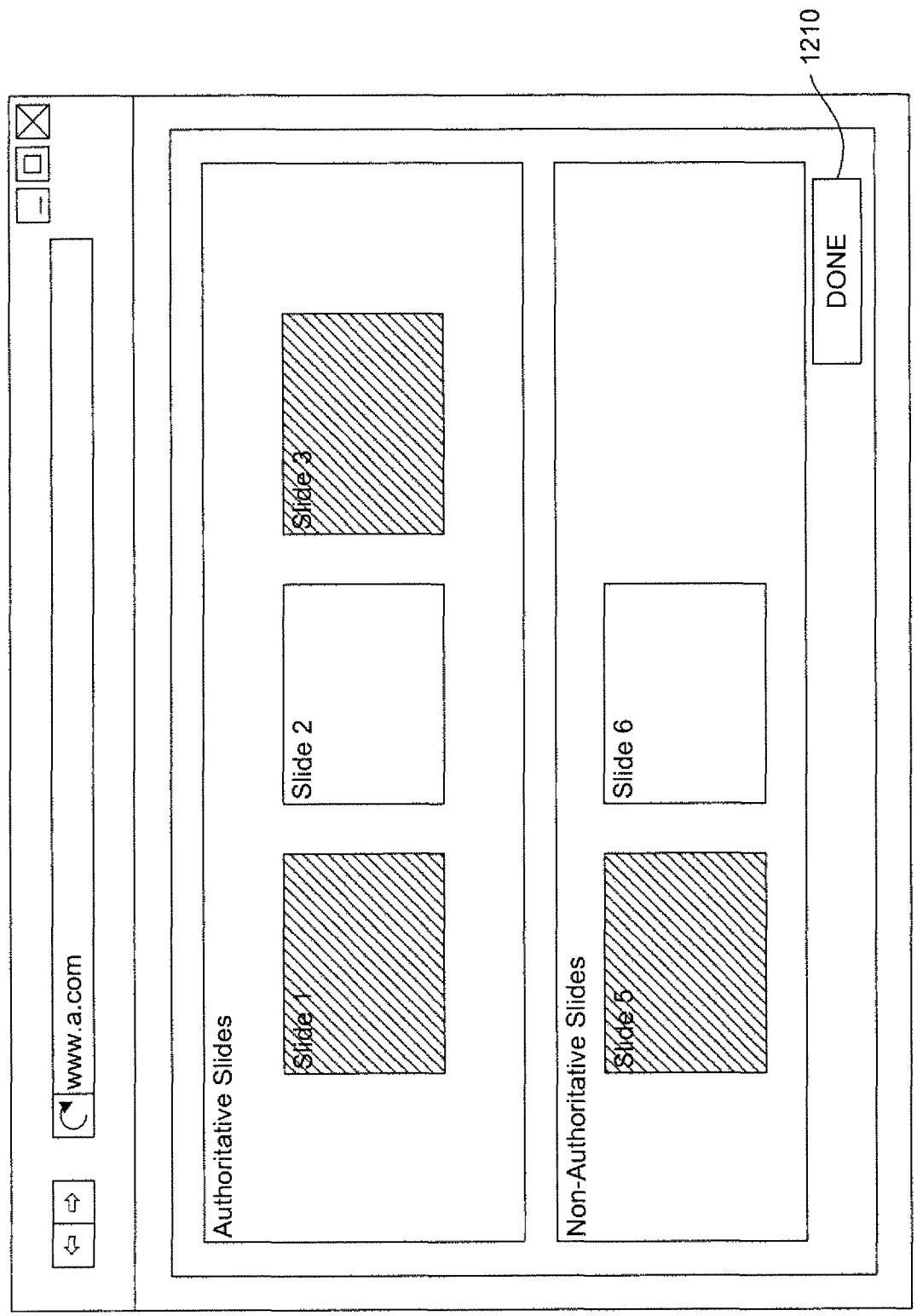
FIG. 12 is a screen shot in accordance with one aspect of the invention.

As shown in FIG. 12, a user may select both authoritative slides and non-authoritative slides. For example, the user may click a slide with mouse cursor, whereupon the web page highlights the selected slide or otherwise indicates that it is selected.

Figure 13:
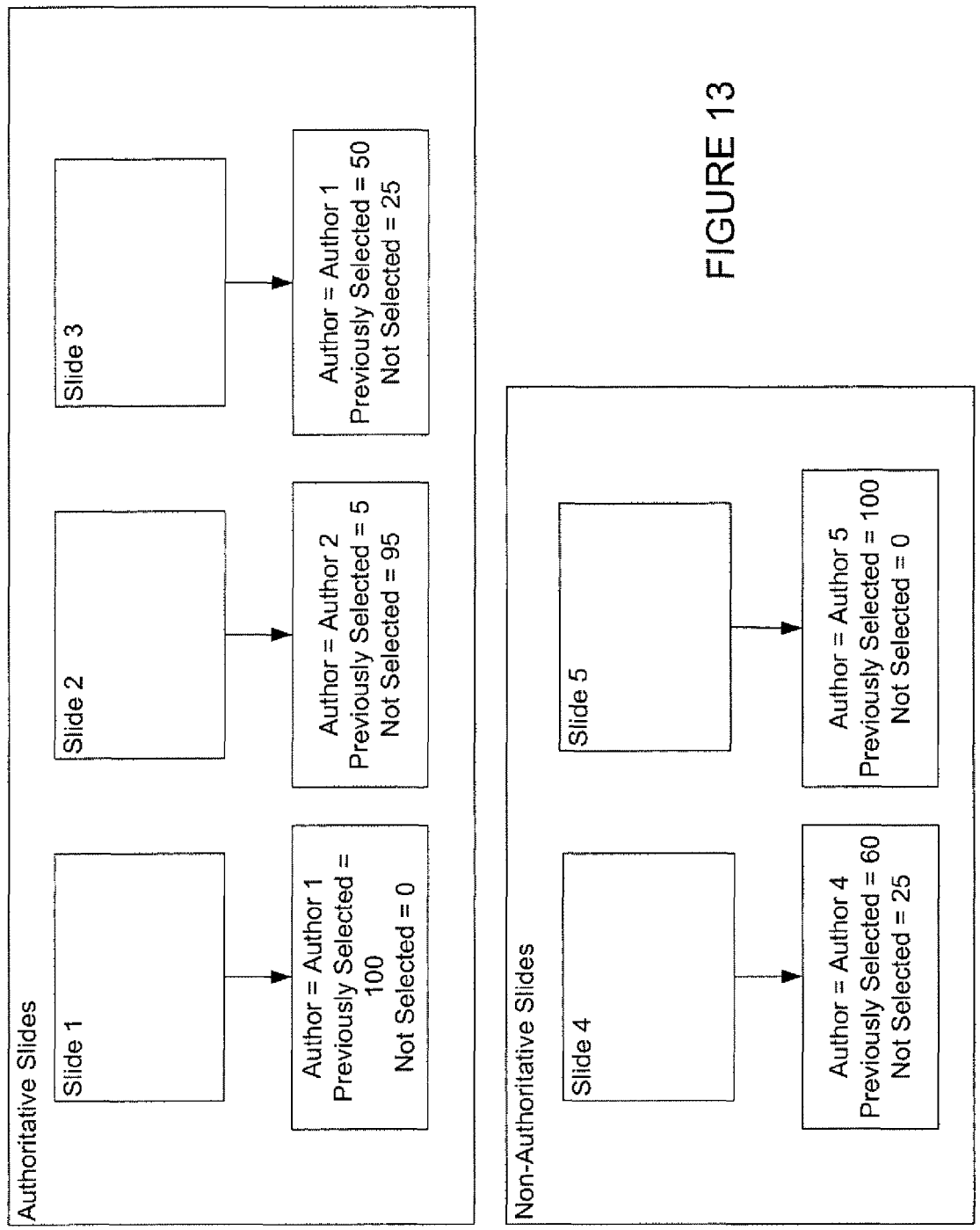
FIG. 13 is a diagram in accordance with one aspect of the invention.

A slide's designation as authoritative or non-authoritative may change. One manner of potentially changing a slides status as authoritative or non-authoritative is shown in FIG. 13, where the program tracks selection rates for each slide. For example, slide 2, an authoritative slide, has been presented 100 times, selected 5 times and not selected 95 times. The number of times a slide has been selected and not selected may not be the same for each slide if users have the ability to use or reject individual slides. The program may also store information regarding the author of the slide. In the example, Author 1 is the author of slide 3.

Figure 14:
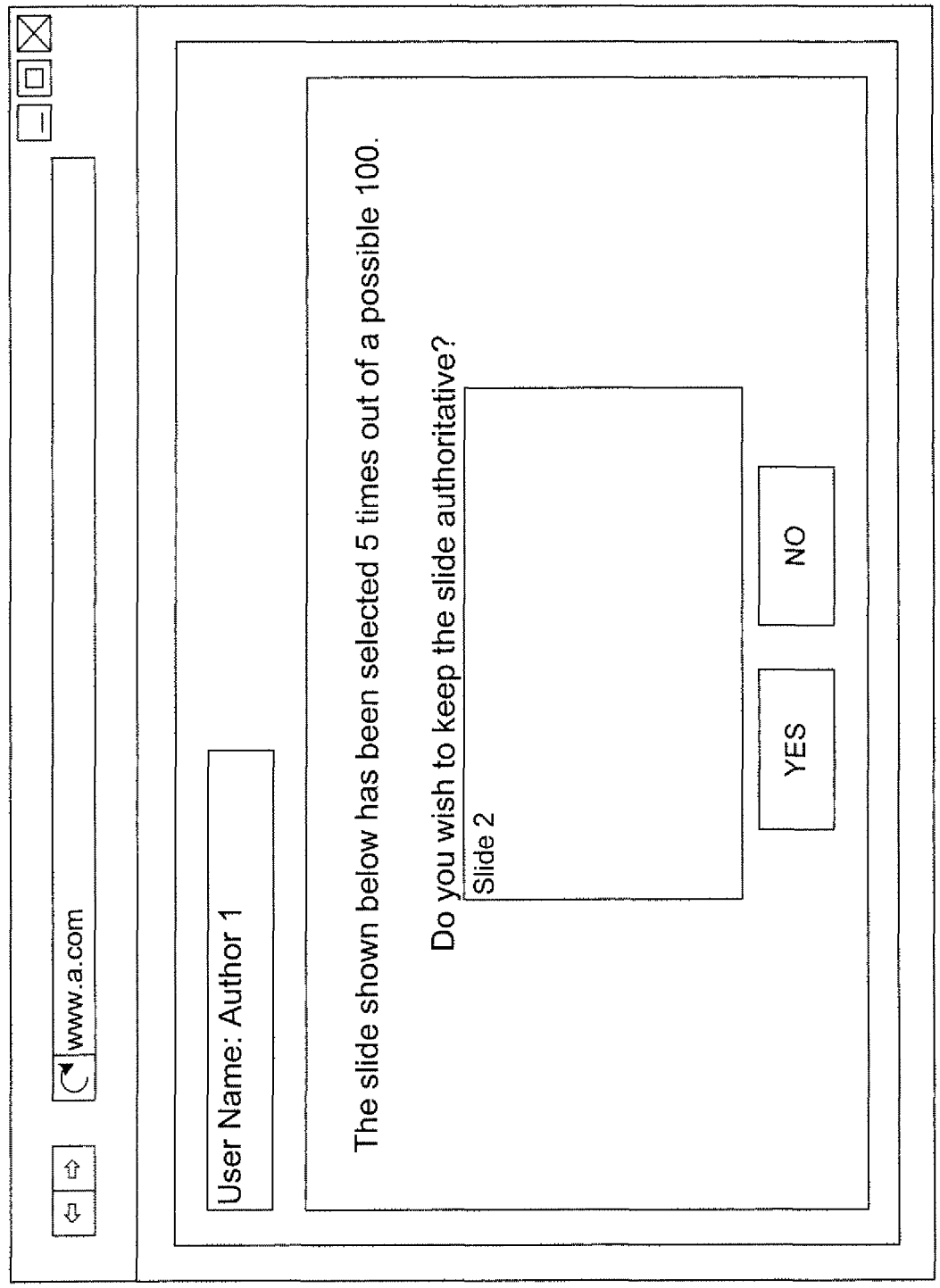
FIG. 14 is a screen shot in accordance with one aspect of the invention.

When the selection rate of a particular authoritative slide is relatively low, or the system and method otherwise determines that the authoritative status of the slide needs to be downgraded, the program may prompt the slide's author accordingly. In addition or alternatively, the system and method may prompt a user designated in the system as having authority to change the authoritative status of a slide. As shown in FIG. 14, Author 2 is given the opportunity to choose whether to continue slide 2's designation as authoritative. Author 2 may, for example, select a "yes" or "no" button and thereby confirm or change the slide's authoritative designation.

A similar process may be used to designate non-authoritative slides as authoritative. For example, as shown in FIG. 13, slide 5 has been selected 100 times and not selected zero times. The program may then prompt the author of the slide regarding whether the author would like the slide to be considered for an authoritative designation by a program administrator. In another example, the program may prompt a user designated in the system as having authority to change the authoritative status of a slide When the user is finished with selecting slides from a particular recommended product deck, the user may also select slides from additional recommended product decks. For example, if the user chooses the done button 1210, the program may display a screen similar to FIG. 8 with additional recommended product decks. The user may then choose a different, or return to the last, recommended product deck.

After the user is finished selecting slides, the system and method may provide the user with a deck of the selected slides. For example, the slides may be stored as an online or offline presentation in connection with the Google Docs service. The user or another person may then display the slides to the potential customer that issued the RFP or any other entity.

In one aspect of the system and method, the user may directly input business categories relevant to the product matrix or identifier information relevant to selecting presentation slides. As shown in FIG. 15, the user may be prompted to choose which business categories are relevant. When the user chooses clothing, a subcategory box may display a selectable list of relevant subcategories. In the example, the user chooses the subcategories pants, gloves and socks. This information may be used to determine which identifiers or tags will be used in the comparison with the tags associated with the presentation slides.

In another aspect, the proposal information may be associated with identifiers which are of more than one category. In one aspect, the tags within a single category are mutually exclusive to one another. For example "pants" and "shirts" may be tags in a clothing category, but "shirts" and "blouses" are not mutually exclusive and thus would not be in the same category.

Figure 16:
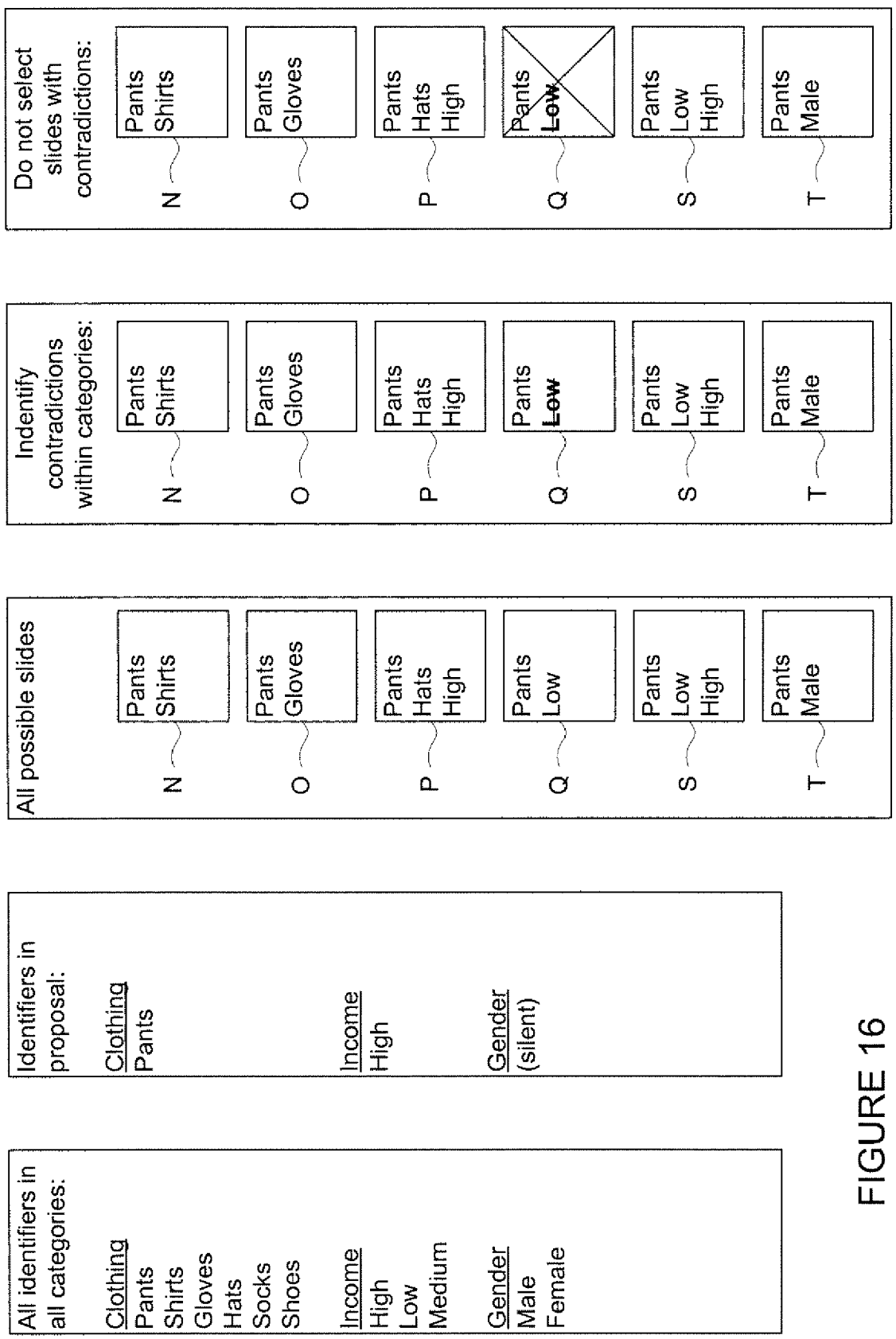
FIG. 16 is a diagram in accordance with one aspect of the invention.

As shown in FIG. 16, the system and method may select slides based on the tags associated with more than one category. For example, the proposal information may be associated with the clothing and income categories. Other categories may exist, such as gender. In the example, because the proposal information is not associated with tags of the gender category, this category may not be relevant to the selection of slides.

Where multiple categories of tags are associated with the proposal information, slides may be selected in various ways. Slides may be selected if they include an overlapping identifier in each category. For example, slides P and S are associated with the proposal's pants and high tags. Slides may also be selected if the slide is not associated with tags of a specific category. For example, slides N, O and T are not associated with the high tag in the income category and may thus be selected based on the overlap with the clothing category.

In one aspect, slides are not selected if the slide is associated with a tag of one of the proposal's categories, but none of the tags of the category overlap. For example, the only tag of the income category associated with slide Q is the low tag. Therefore, slide Q may not be selected, regardless of any overlap in other categories. Slides N, O, P, S, and T may be further selected and not selected in accordance with the processes described above.

Although FIG. 16 depicts three specific categories; clothing, income, and gender, it will be appreciated that the system and method are not limited to three categories and that various other categories are contemplated. Other exemplary categories may include "automotive" and "consumer packaged goods." For example, tags associated with the "automotive" category may include "auto parts & services," "auto sales," "automakers," "automotive websites," and "other motorized vehicles." In another example, tags associated with the "consumer packaged goods" category may include "personal care," "food & beverage," "household," and "pet."

As noted above, the computer may be connected to a network and capable of sending and receiving information. The program may also connect to the network to retrieve information which may be used to update the program information, for example, product matrix 155, slide information 160, or user data 165. In another example, the system and method may be implemented in connection with an Internet browser.

The program may also use the network to collect information dynamically from various servers and input this information into the slides. In this regard, the program may constantly update statistics, inventory information, sales estimates, or other information such as benchmarks for products or for search and display availability. For example, the program may collect information such as search trends for specific automobiles or related sales information. In one example, a user may choose a slide which includes a template for dynamic information. The program may prompt the user regarding whether or not to collect the information for use in the slide. In another example, the program may collect and include the dynamic information in the slide automatically, before or after the slide is chosen by the user.

Accordingly, in some aspects, the system and method permits—and may even recommend—the selection of slides that include pre-existing information and information which is inserted at the time of selection by the user. The slides containing dynamic data may also download the information after selection, e.g., at the time the slides are displayed to a potential customer.

In one aspect of the system and method, slides may be displayed to the user in any manner. As shown in FIG. 11, slides may be shown as selected by highlighting the slides in a pattern or a color. Selected slides may also darken, lighten, or disappear. The user may click on a slide to select the slide or may drag and drop the slide into an area of the display designated as a presentation box. The user may also be able to enlarge a slide by clicking on the slide or hovering over the slide with the cursor.

Rather than only displaying the selected slides and not displaying secondary slides which do not have common tags or are dominated by other slides, the program may display these secondary slides. For example, secondary slides may be displayed in a separate area of the display, such as below the selected slides, or the slides may be displayed at the bottom of a list including the selected slides. In another example, the user may have an option to view the secondary slides by selecting a button.

User entry screens and displays may be created using well-known standards for web-based user interfaces, including but not limited to the Google Web Toolkit, Adobe Dreamweaver, and the like, including templates and markups that are populated by data retrieved from storage and entered by users, and slides that are rendered and displayed to users. Slides may be stored, rendered and displayed in any commonly-accessible format, such as, for example, an HTML-based web document, a Google presentation document, Adobe portable document format, a graphical image, a Microsoft PowerPoint document, an Open Office open-XML format document, an Apple Keynote document, and the like.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A method of displaying presentation slides, the method comprising:
   receiving a request for information, the request being associated with a first set of identifiers;
   selecting, with a processor, a group of presentation slides from among a plurality of presentation slides based on a comparison of the identifiers associated with the request and identifiers associated with the plurality of presentation slides, where a presentation slide is a slide containing information to be rendered to a human readable display, and wherein:
      the slides are selected such that each selected slide has at least one overlapping identifier, where the overlapping identifier is a member of both the first set of identifiers and the slide's set of identifiers,
      and the slides are selected such that, within the group, the overlapping identifiers identified with one slide are not a proper subset of the overlapping identifiers in another slide, wherein a set of one or more overlapping identifiers associated with a first slide are a proper subset of a set of overlapping identifiers associated with a second slide if all of the overlapping identifiers of the set of one or more overlapping identifiers associated with the first slide are also included in the set of overlapping identifiers associated with the second slide and the set of one or more overlapping identifiers associated with the first slide is different from the set of overlapping identifiers associated with the second slide; and
   displaying the group of presentation slides.

2. The method of claim 1, further comprising selecting recommended products wherein each recommended product is associated with a plurality of presentation slides.

3. The method of claim 2, wherein the group of presentation slides is selected from the plurality presentation slides associated with a selected recommended product.

4. The method of claim 1, further comprising inserting information from a node on a network into a slide after the slide is selected.

5. The method of claim 1, further comprising inserting information from a node on a network into a slide when the slide is displayed.

6. The method of claim 1, wherein the identifiers are divided into a plurality of categories wherein the request for information is associated with tags of at least two categories.

7. The method of claim 6, wherein slides are selected such that for each slide selected there is at least one overlapping tag in each overlapping category, where a category overlaps if the request and the slide are associated with tags within the category.

8. A method of displaying presentation slides, the method comprising:
   receiving input from a user;
   associating identifier information with the input;
   receiving a request for a recommended product wherein the recommended product is associated with a slide deck of a plurality of presentation slides;
   selecting, with a processor, a group of presentation slides from the deck based on a comparison of the identifiers associated with the input and identifiers associated with the deck, wherein:
      the slides are selected such that each selected slide has at least one common identifier, where an identifier is a common identifier if the identifier is associated with both a slide and the input,
      and the slides are selected such that, within the group, common identifiers associated with one slide are not dominated by common identifiers in another slide, wherein a set of one or more common identifiers associated with a first slide are a proper subset of a set of common identifiers associated with a second slide if all of the common identifiers of the set of one or more common identifiers associated with the first slide are also included in the set of common identifiers associated with the second slide and the set of one or more common identifiers associated with the first slide is different from the set of common identifiers associated with the second slide; and
   displaying the group of presentation slides.

9. The method of claim 8, further comprising inserting information from a node on a network into a slide of the group of presentation slides if the slide is selected by a user.

10. The method of claim 8, further comprising inserting information from a node on a network into a slide of the group of presentation slides when the slide is displayed.

11. The method of claim 8, wherein the identifiers are divided into a plurality of categories wherein the request for information is associated with tags of at least two categories.

12. The method of claim 11, wherein the slides are selected such that for each slide selected there is at least one overlapping tag in each overlapping category, where a category overlaps if the request and the slide are associated with tags within the category.

13. A system comprising:
   a user input device;
   a memory storing instructions and presentation visual data including a plurality of presentation slides;
   a processor in communication with the user input device so as to process information received from the user input device in accordance with the instructions; and
   a display in communication with, and displaying information received from, the processor;
   the instructions comprising:
   receiving a request for a presentation slide, the request being associated with at least one tag;
   selecting, with a processor, a group of presentation slides from the presentation visual data based on a comparison of the at least one tag associated with the request and tags associated with the plurality of presentation slides, wherein:
      the slides are selected such that each selected slide has at least one overlapping tag, where a tag overlaps if the tag is a member of both the first set of tags and the slide's set of tags,
      and the slides are selected such that, within the group, the overlapping tags identified with one slide are not a proper subset of the overlapping tags in another slide, wherein a set of one or more overlapping tags associated with a first slide are a proper subset of a set of overlapping tags associated with a second slide if all of the overlapping tags of the set of one or more overlapping tags associated with the first slide are also included in the set of overlapping tags associated with the second slide and the set of one or more overlapping tags associated with the first slide is different from the set of overlapping tags associated with the second slide; and displaying a proposal slide of the group of slide.

14. The method of claim 13, wherein the tags are divided into a plurality of categories and wherein the request for information is associated with tags of at least two categories.

15. The method of claim 14, wherein the slides are selected such that for each slide selected there is at least one overlapping tag in each overlapping category, where a category overlaps if the proposal and the slide are associated with tags within the category.

16. The method of claim 13, wherein a displayed slide may be selected though a user input to the user input device.

17. The method of claim 13, wherein a displayed slide may be edited by a user input to the user input device.

18. A system comprising:
a user input device;
a memory storing instructions and slide data including a plurality of presentation slides, each slide associated with priority information;
a processor in communication with the user input device so as to process information received from the user input device in accordance with the instructions; and
a display in communication with, and displaying information received from, the processor;
the instructions comprising:
receiving a request for a presentation slide, the request being associated with at least one identifier;
selecting, with a processor, a group of presentation slides from the slide data based on a comparison of the at least one identifier associated with the request and identifiers associated with the plurality of presentation slides, and wherein:
the slides are selected such that each selected slide has at least one overlapping identifier, where an identifier overlaps if the identifier is a member of both the first set of identifiers and the slide's set of identifiers;
and the slides are selected such that, within the group, the overlapping identifiers identified with one slide are not a proper subset of the overlapping identifiers in another slide, wherein a set of one or more overlapping identifiers associated with a first slide are a proper subset of a set of overlapping identifiers associated with a second slide if all of the overlapping identifiers of the set of one or more overlapping identifiers associated with the first slide are also included in the set of overlapping identifiers associated with the second slide and the set of one or more overlapping identifiers associated with the first slide is different from the set of overlapping identifiers associated with the second slide; and
determining, based on the priority information, which of the group of slides are to be displayed as priority slides and which of the group of slides are to be displayed as non-priority slides;
displaying the priority slides.

19. The system of claim 18, wherein the slide data further comprises selection information and author information associated with each slide, and wherein the instructions further comprise:
determining whether a priority slide is generally not selected based on the selection information; and sending a request to the author of an priority slide to redesignate the priority slide as a non-priority slide.

20. The system of claim 18, wherein the slide data further comprises selection information and author information associated with each slide, and wherein the instructions further comprise:
determining whether a priority slide is generally not selected based on the selection information; and
sending a request to the author of a priority slide generally selected to determine whether the slide's priority designation should change.

21. A method of providing a proposal, the method comprising:
receiving a request for a presentation of slides;
determining a set of tags associated with the request;
providing data identifying a recommended product associated with a plurality of presentation slides;
displaying a group of presentation slides selected by a processor, wherein the slides are selected based on a comparison of the tags associated with the request and tags associated with the plurality of presentation slides, wherein the group of presentation slides is selected such that each slide of the group of presentation slides has at least one tag common with the tag associated with the request and such that the overlapping tag identified with a slide of the group of presentation slides are not a dominated by the overlapping tag in another slide, wherein a set of one or more overlapping tags associated with a first slide are a proper subset of a set of overlapping tags associated with a second slide if all of the overlapping tags of the set of one or more overlapping tags associated with the first slide are also included in the set of overlapping tags associated with the second slide and the set of one or more overlapping tags associated with the first slide is different from the set of overlapping identifiers associated with the second slide; and
providing a proposal of slides selected from the group of presentation slides.

22. The method of claim 21, further comprising selecting the recommended product from a group of products based on a product matrix.

23. The method of claim 22, wherein the product matrix associates products with information determined from the request.

24. A tangible computer-usable storage medium on which computer readable instructions of a program are stored, the instructions, when executed by one or more processors, cause the one or more processors to perform a method comprising:
receiving a request for information associated with a first set of identifiers;
selecting a group of presentation slides from among a plurality of presentation slides based on a comparison of the identifiers associated with the request and identifiers associated with the plurality of presentation slides, where a presentation slide is a slide containing information to be rendered to a human, and wherein:
the slides are selected such that each selected slide has at least one overlapping identifier, where an identifier overlaps if the identifier is a member of both the first set of identifiers and the slide's set of identifiers,
and the slides are selected such that, within the group, the overlapping identifiers identified with one slide are not a proper subset of the overlapping identifiers in another slide, wherein a set of one or more overlapping identifiers associated with a first slide are a proper subset of a set of overlapping identifiers associated with a second slide if all of the overlapping identifiers of the set of one or more overlapping identifiers associated with the first slide are also included in the set of overlapping identifiers associated with the second slide and the set of one or more overlapping identifiers associated with the first slide is different from the set of overlapping identifiers associated with the second slide; and displaying the group of presentation slides.

25. The tangible computer-usable storage medium of claim 24, wherein the identifiers are divided into a plurality of categories, the request for information is associated with tags of at least two categories, and the method further comprises selecting slides such that for each slide selected there is at least one overlapping identifier in each overlapping category, where a category overlaps if the request and the slide are associated with identifiers within the category.

* * * * *